No. 786,202. PATENTED MAR. 28, 1905.
J. GAGNE.
MOWER OR REAPER.
APPLICATION FILED JULY 27, 1904.

2 SHEETS—SHEET 1.

Witnesses:
M. Macaulay
E. M. Donaldson

Jules Gagné
Inventor
by A & B Harvey
his Attorneys.

No. 786,202. PATENTED MAR. 28, 1905.
J. GAGNÉ.
MOWER OR REAPER.
APPLICATION FILED JULY 27, 1904.
3 SHEETS—SHEET 2.
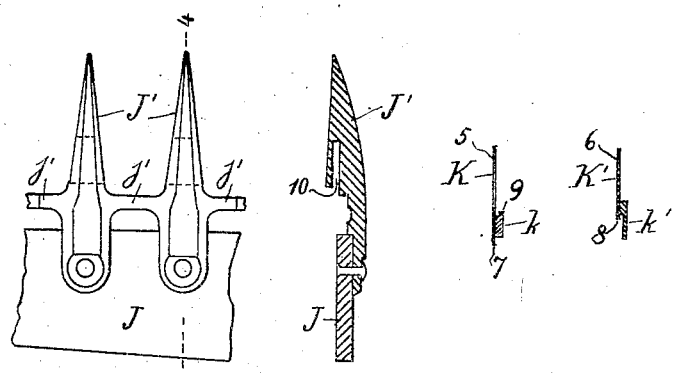
Fig. 3.   Fig. 4.   Fig. 5.   Fig. 6.
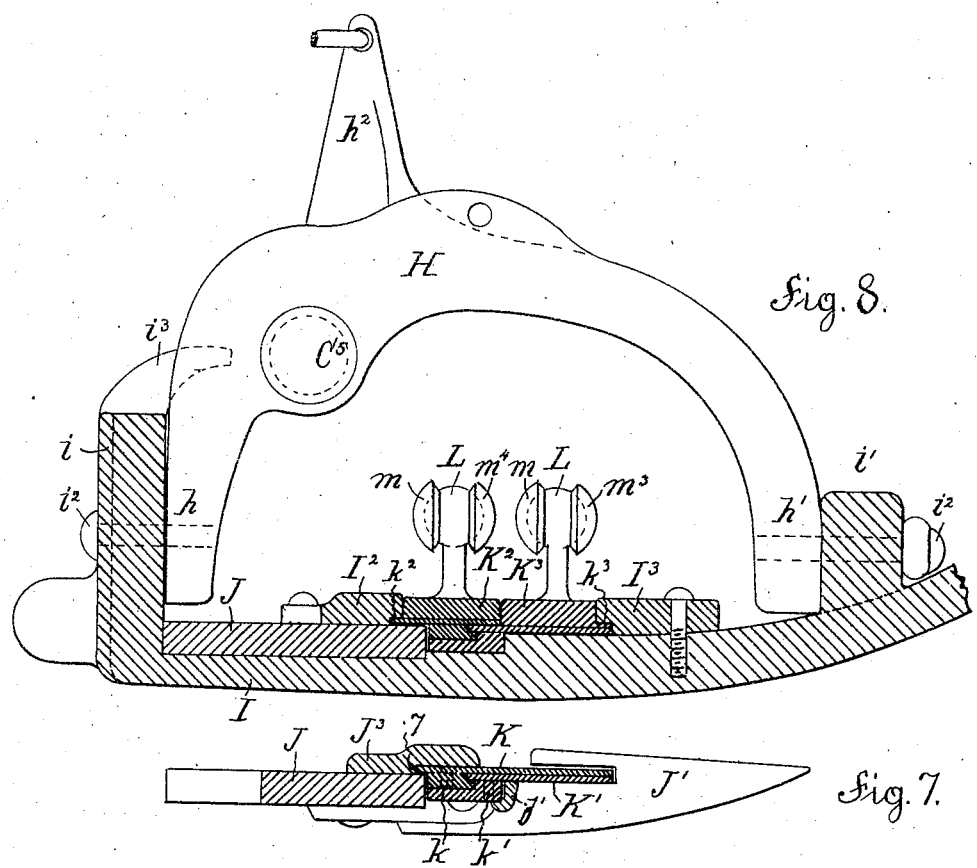
Fig. 8.
Fig. 7.
Witnesses:
M. Macaulay
E. W. Donaldson
Jules Gagné
Inventor
by A & B Harvey
his Attorneys.

No. 786,202.

Patented March 28, 1905.

UNITED STATES PATENT OFFICE.

JULES GAGNÉ, OF JACKFISH LAKE, CANADA, ASSIGNOR OF ONE-HALF TO ALBERT EDWARD DUNN, OF BATTLEFORD, CANADA.

MOWER OR REAPER.

SPECIFICATION forming part of Letters Patent No. 786,202, dated March 28, 1905.

Application filed July 27, 1904. Serial No. 218,377.

*To all whom it may concern:*

Be it known that I, JULES GAGNÉ, of Jackfish Lake, in the district of Saskatchewan, one of the North-West Territories of the Dominion of Canada, have invented certain new and useful Improvements in Mowers or Reapers; and I do hereby declare that the following is a full, clear, and exact description of the same, reference being had to the accompanying drawings, forming a part hereof.

My invention, which will be hereinafter fully set forth and claimed, relates to mowers, reapers, and harvesters, and especially to the cutters and their gear.

The object of my invention is a double-acting cutter for mowers, reapers, and harvesters.

Figure 2:
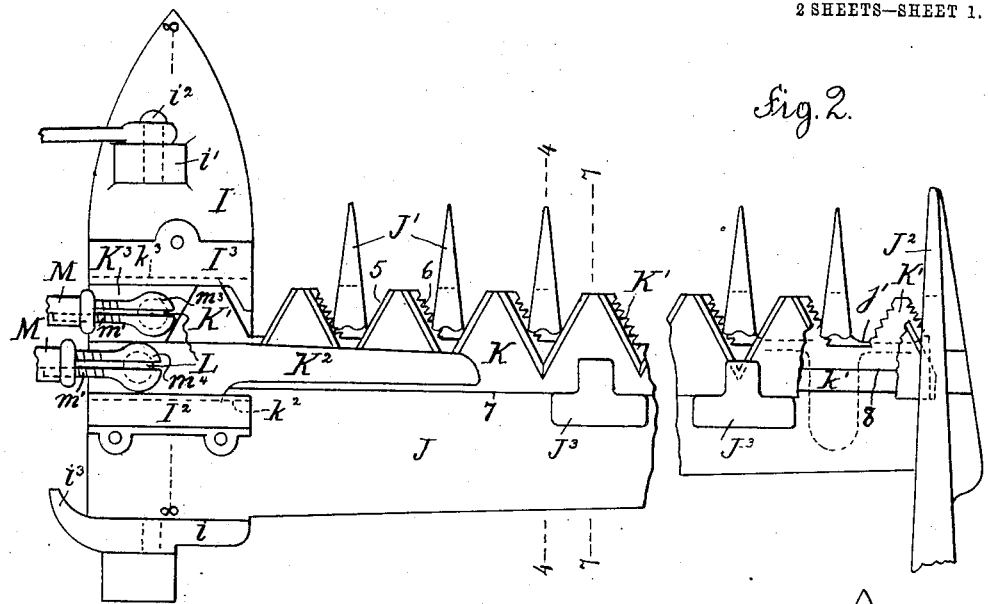
Figure 1:
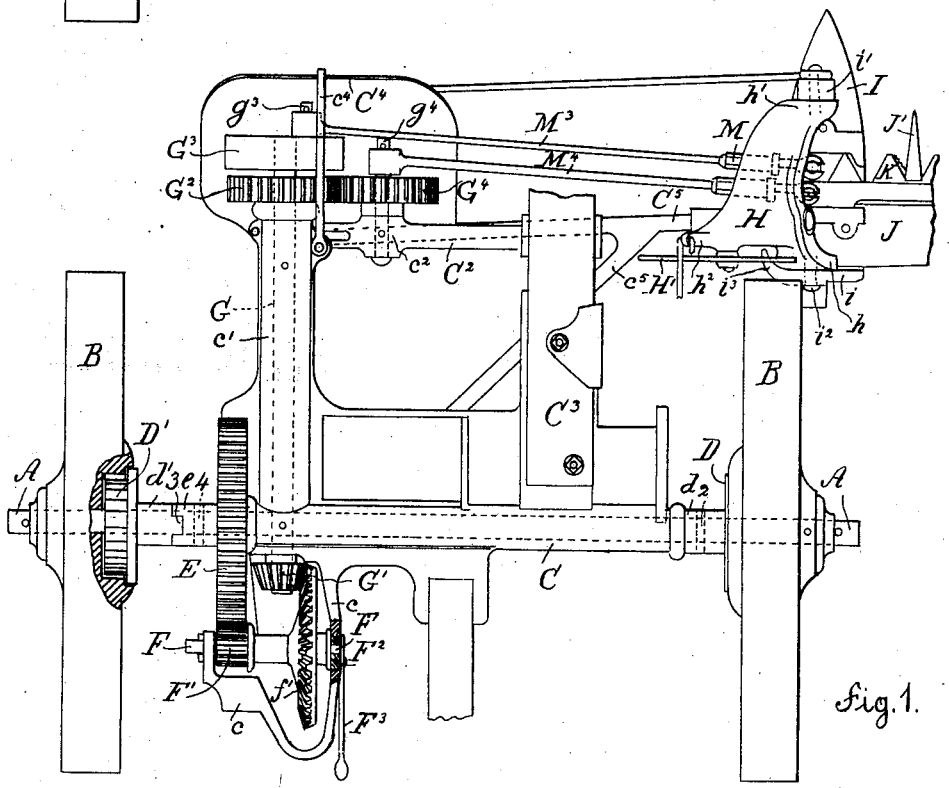

Figure 1 is a top view of a mowing-machine with most of the adjusting devices omitted and the front somewhat raised, parts being broken off and showing the cutter-gear. Fig. 2 is a top view of the finger-bar with cutter-blades and shoes, parts being broken out and shown double the size of Fig. 1. Fig. 3 is a bottom view of part of the finger-bar. Fig. 4 is a transverse section of the same on line 4 4, Figs. 2 and 3. Figs. 5 and 6 show the two cutter-blades in cross-section separately. Fig. 7 is a transverse section on line 7 7, Fig. 2, showing finger-bar and cutters in section double the size of Figs. 2, 3, 4, 5, and 6. Fig. 8 is a longitudinal section of the inner shoe on line 8 8, Fig. 2, showing the cutter-guides in transverse section and parts in elevation on the same scale as Fig. 7.

B B are the driving-wheels running loose on the axle A, only the ends of which are visible in Fig. 1, and which is journaled in the tubular framing part C. The grass or grain side wheel connects with the axle A by the sleeve-like hub $d$ of a ratchet (not visible) within the wheel-hub, a pin 2, (shown dotted,) passing through sleeve and axle, so that only the forward movement is communicated to the axle. The stubble-side wheel has a similar ratchet D', the sleeve-like hub $d'$ of which is connected by a clutch 3 to the sleeve-like hub $e$ of a spur-wheel E, which is secured to the axle by a pin 4. (Shown dotted.) The axle-frame C is extended rearwardly at $c$ to provide a casing and bearing for the axle F, upon which are journaled a pinion F' and bevel-wheel $f'$, formed integrally, and the former of which gears into the spur-wheel E. The inner end of the axle F is journaled eccentrically in a small disk $F^2$, which is journaled in the framing $c$. To this disk a lever $F^3$ is attached by turning which the bevel-wheel $f'$ is thrown back and out of gear with the bevel-pinion. The lever $F^3$ is made flexible, so that it may bend outward and be thrown into notches on the frame to keep it in position.

Formed integrally and at a right angle with the frame C is a tubular arm $c'$, in which is journaled a shaft G (shown dotted) below the axle A. It carries a bevel-pinion G', gearing into the bevel-wheel $f'$, which imparts motion to said shaft. At the lower projecting end the shaft carries a spur-wheel $G^2$ and a crank-disk $G^3$, having a crank-pin $g^3$. The spur-wheel $G^2$ gears into another spur-wheel, $G^4$, which carries a crank-pin $g^4$ and is secured upon a short axle journaled into a hub $c^2$, formed in a cross-bar $C^2$, which is secured at one end to the arm $c'$ and at the other to the tongue-stock $C^3$.

$C^4$ is a guard-plate for the crank-disks and their gearing, braced by the bail $c^4$.

A bracket H, Figs. 1 and 8, is journaled to the end of the transverse bar $C^5$, which is braced by the diagonal bar $c^5$, the former being secured to the lower end of the arm $c'$ and the latter to the transverse frame part C. To this bracket H is pivotally secured the shoe I, which carries the finger-bar and cutters, lugs $i\ i'$ being formed integrally with the shoe, receiving the pivot-pins $i^2$, passing through the legs $h\ h'$ of the bracket. The bracket H being journaled on the transverse bar $C^5$ allows the shoe I, and with it the finger-bar and guards, to be tilted longitudinally in a vertical plane—*i. e.*, at an angle to the ground—by operating on the arm extension $h^2$, while the pivotal connection between shoe I and bracket H allows the shoe, and with it the finger-bar, to be adjusted longitudinally (in the sense of the finger-bar) to the ground and to be raised to a vertical position when not in use. The latter movement is effected by depressing the ear extension $i^3$ of the lug $i$ at the rear of the pivotal joint formed by the pins $i^2$ by means of the lever H', which is pivoted to the bracket H, Fig. 1.

J is the finger-bar firmly secured to the inner shoe I and carrying the outer shoe $J^2$ and the fingers or guards J', (shown in Figs. 2, 3, 4, and 7,) and also the two cutters K and K', particularly shown in Figs. 2, 5, 6, and 7.

The cutters consist of two blades with large triangular teeth, the upper one K having the sloping sides 5 of its teeth beveled to a cutting edge. It lies flat on a lower blade K', having the sloping sides of its teeth serrated, the serrations 6 being beveled from below, so that the cutting edges of the two blades are in contact. A rabbeted guide-strip $k$ is secured to the bottom of the upper blade, with its plain rear edge a little distance from the rear edge of the blade, leaving the latter, 7, to overlap the front edge of the finger-bar, the narrow face being attached and the rabbeted edge forming a groove with the blade K. A rabbeted guide-strip $k'$ is also secured with its narrow face to the under side of the lower blade K', the check edge a little distance from the rear edge 8 of the blade, but the rear edge of the strip projecting rearwardly under and being coextensive with the rear edge of the strip $k$, the rabbet of the strip $k$ forming with the blade K a groove into which the rear edge 8 of the blade K' enters as a tongue and the rabbeted front edge of the strip $k$, forming a tongue 9, entering the groove formed between the rear edge of the blade K' and the guide-strip $k'$. The two blades thus joined are kept in close vertically-locked contact and run independently on each other. The guide-strip $k'$ of the lower blade is confined between the front edge of the finger-bar J and a bed-groove in the guard J', its front edge being protected by a connecting piece $j''$, extending from one guard J' to another. The cutting portions of the cutters K and K' run in slots 10 in the guards J'. The rear edge 7 of the upper blade K runs in a groove in the guide-brackets $J^3$, which are secured to the finger-bar.

The operating ends of the blades K K' are reinforced with plates running edge to edge on the medial line—K with a long strip terminating in an end plate $K^2$, having a laterally-projecting tongue $k^2$ running in a groove in a guide-plate $I^2$, and K' with a plate $K^3$, having a laterally-projecting tongue $k^3$ running in a groove in a guide-plate $I^3$, said guide-plates being secured to the shoe I. A slide-bed corresponding to the guide-strip $k'$ is formed in the shoe and continued along the finger-plate and guards.

Upon each of the end plates $K^2$ and $K^3$ is secured a vertical stem carrying a ball-head L, as shown in Figs. 2 and 8. These heads are connected with the pitmen $M^3$ and $M^4$, Fig. 1, which extend to and are journaled upon the crank-pins $g^3$ and $g^4$, respectively. The pitman connections, with the heads L, form universal joints, the pitmen terminating each in a neck, $m^3$ and $m^4$, which forms one half of a split rod having a cup $m$ at the end. The other half of the split rod, $m'$, is a separate piece and has a similar cup $m$. The two cups clip the ball L, being held in place by a screw-buckle M, the exterior of the necks $m'$ $m^3$ and $m'$ $m^4$, as pairs, being threaded for the buckle.

It will be seen that the forward motion of the wheels B is transmitted to the spur-wheel E and thence to the pinion F' and bevel-wheel $f'$. The latter, if not thrown out of gear by the lever $F^3$, transmits the motion multiplied to the shaft G by the bevel-pinion G', rotating the crank-disk $G^3$ and the spur-wheel $G^4$, which also acts as a crank-disk, and thus sets the pitmen $M^3$ and $M^4$ into motion in opposite directions. The pitmen operate the cutter-bars K and K' also in opposite directions and against each other, being guided in the shoe I and finger-bar J, and the two cutter-bars act together and independently of the finger-bar, fingers or guards, or other auxiliary means.

I claim as my invention—

1. In a mower, reaper or harvester, the combination with the finger-bar of a double-bladed cutter consisting of an upper and a lower blade in close contact with each other, each having large triangular-shaped teeth, the upper one with plain beveled edges and the lower one having the edges of the teeth finely serrated, a guide-strip on the lower side of the upper blade having its rear edge set forward from the rear edge of the blade and the front edge rabbeted to form a groove with the blade adapted to receive the rear edge of the lower blade as a tongue and a tongue adapted to enter a groove, a guide-strip on the lower blade extending under the upper strip and rabbeted to form a groove with the lower blade into which the tongue formed by the upper strip enters and means of giving a longitudinal reciprocating movement to each blade in opposite directions, substantially as set forth.

2. In a mower, reaper or harvester, the combination with the finger-bar of a double-bladed cutter consisting of an upper and a lower blade held in close contact by a guide-strip secured to the bottom of each and rabbeted to form groove and tongue and interlock vertically, each blade formed with large triangular teeth having cutting edges which in the upper one are beveled and in the lower one serrated and means to give a reciprocating motion in opposite directions to said blades, substantially as set forth.

3. In a mower or harvester, the combination with the finger-bar and guards shaped to form a slide-bed for the cutter-bar, guide-brackets secured to the top of the finger-bar to hold said bar, a cutter-blade having large triangular pieces cut out of its front and the edges beveled to a cutting edge and having a guide-strip secured to the bottom near the rear edge said strip being rabbeted to form a groove and a tongue at its front edge, a cutter-blade having its upper face in contact with the lower face of the top blade and kept in contact by a rabbeted guide-strip secured to the bottom set forward from the rear edge and extending under the guide-strip of the top plate, the rear edge of said bottom blade forming a tongue and entering the groove between the top blade and guide-strip and the tongue of the latter entering the groove formed by the bottom blade and its guide-strip, said bottom blade having its front formed into teeth the edges of which are serrated and means of giving a reciprocating motion to said blades in opposite directions, substantially as set forth.

4. In a mower or harvester, the combination with the finger-bar and shoe, of a double-bladed cutter bedded and guided thereon, tongued end plates at the operating ends, grooved guide-brackets secured to the shoe and receiving the tongues of the end plates, a ball secured to each end plate, pitmen connecting said balls by split cups and buckles and cranks upon which the opposite ends of the pitmen are journaled, said cranks receiving motion to give a reciprocating movement in opposite directions to said pitmen, substantially as set forth.

5. In a cutter for mowers, reapers and harvesters, the combination of two blades in close contact one above the other and both having large triangular teeth, the upper one plain and the lower one serrated and the two blades vertically interlocked one with the other by rabbeted guide-strips secured to the rear of their lower faces, the rabbeted faces of the strips facing and engaging each other as tongues and grooves, the lower blade being narrower than the top blade and its rear edge forming a tongue entering the groove formed by the top blade and its rabbeted guide-strip and the lower guide-strip extending under and being in contact with the upper guide-strip, substantially as set forth.

In testimony whereof I have signed in the presence of the undersigned witnesses.

JULES GAGNÉ.

Witnesses:
E. M. DONALDSON,
G. PIOTRZKOWSKY.